United States Patent [19]

Zhiglinsky et al.

[11] Patent Number: 5,418,805
[45] Date of Patent: May 23, 1995

[54] DEVICE FOR PUMPING THE ACTIVE MEDIUM OF A WHITE LIGHT LASER

[75] Inventors: Andrei G. Zhiglinsky; Alexander M. Izmailov, both of St. Petersburg, Russian Federation

[73] Assignee: American Biogenetic Sciences, Inc., Copiague, N.Y.

[21] Appl. No.: 180,407

[22] Filed: Jan. 11, 1994

[51] Int. Cl.6 ................................. H01S 3/09
[52] U.S. Cl. ......................... 372/69; 372/28; 372/23; 372/13; 372/101
[58] Field of Search .......... 372/23, 98, 69, 70, 372/9, 28, 13, 101

[56] References Cited

U.S. PATENT DOCUMENTS

| | | |
|---|---|---|
| 3,735,280 | 5/1973 | Johnston, Jr. . |
| 3,774,121 | 11/1973 | Ashkin et al. . |
| 3,928,817 | 12/1975 | Chodzko . |
| 3,993,963 | 11/1976 | Logan et al. ............... 372/50 |
| 4,173,738 | 11/1979 | Boling et al. . |
| 4,287,486 | 9/1981 | Javan . |
| 4,494,235 | 1/1985 | Guch, Jr. et al. . |
| 4,502,144 | 2/1985 | Suhre . |
| 4,710,937 | 12/1987 | Oomori et al. . |
| 4,731,794 | 3/1988 | Schafer . |
| 4,759,026 | 7/1988 | Hollins et al. . |
| 4,821,280 | 4/1989 | Kawase ............... 372/23 |
| 4,945,544 | 7/1990 | Tanaka et al. . |
| 5,131,002 | 7/1992 | Mooradian ............ 372/69 |

FOREIGN PATENT DOCUMENTS

| | | |
|---|---|---|
| 1718313A1 | 7/1992 | Russian Federation . |
| 1778840A1 | 11/1992 | Russian Federation . |
| 1778841A1 | 11/1992 | Russian Federation . |

Primary Examiner—Léon Scott, Jr.
Attorney, Agent, or Firm—Pennie & Edmonds

[57] ABSTRACT

A polychromatic or white light laser arrangement for changing the dimensions of the pumped portions of the active medium is realized by employing an optical divider for dividing the pump radiation into at least two beamlets, and one or more lenses for focusing the pump radiation onto the active medium. In one preferred embodiment, the optical divider includes a system of mirrors and lenses, or an acousto-optic deflector.

31 Claims, 5 Drawing Sheets

DEVICE FOR PUMPING THE ACTIVE MEDIUM OF A WHITE LIGHT LASER

CROSS-REFERENCE TO RELATED APPLICATIONS

This application is related to our co-pending U.S. patent application Ser. Nos. 08/180,401 and 08/180,408, which were filed concurrently herewith. The above-identified co-pending applications, which are commonly assigned, are incorporated herein by reference.

TECHNICAL FIELD

The present invention relates to optical instruments and, more particularly, to devices for pumping the active medium of a polychromatic or white light laser.

BACKGROUND OF THE INVENTION

Although conventional lasers emitting coherent radiation at a single wavelength have become indispensable research tools, for many applications there is still a need for a laser emitting simultaneously at a plurality of predetermined wavelengths or with a predetermined spectral composition. The realization of a polychromatic or white light laser provides novel approaches in numerous fields such as medicine, spectroscopy, holography, photo-chemistry, isotope separation, spectrum analysis, optical measurement, and/or ultra-short light pulse generation. In medicine, for example, white light lasers may be used to irradiate human organs with radiation whose spectrum is optimal with respect to the absorption characteristics of the organ under treatment.

Recently, controlled spectrum generation lasers capable of emitting polychromatic or white light radiation have been developed by the inventors. See, for example, the above-identified co-pending U.S. applications; and applicants' patent applications PCT/SU 89/00163 and SU 1718313 A1. Unlike conventional lasers, controlled spectrum generation lasers emit radiation at a plurality of desired wavelengths or of a continuous spectrum with the required optical power spectral distribution.

Specifically, polychromatic or white light radiation is achieved by simultaneously pumping different portions of an active medium disposed within a suitable optical cavity or resonator. That is, the active medium is simultaneously pumped at different distances from the optical axis of the cavity, each portion of the active medium giving rise to the generation of radiation at a different desired wavelength. If the pumped portions are extended and not discrete points, the radiation comprises segments of a continuous radiation spectrum. The number of wavelength components equals the number of sites pumped, while the linewidth of each generated wavelength or bandwidth of the continuous radiation spectrum segment depends on the size of the pumped area, if the pump beam is of sufficient intensity. The operation of the controlled spectrum generation laser is disclosed in more detail in the above-identified patent applications.

Despite its breakthrough success in achieving simultaneous multi-wavelength or polychromatic lasing, the controlled spectrum generation laser has encountered new problems, some of which arise from the nature of simultaneously pumping different portions of the active medium. In this new class of lasers, it is important to be able to control the location and size of the simultaneously pumped portions of the active medium. It is also useful for the pump device mechanism to be able to control the intensity of the lasing radiation at each desired wavelength and to be able to vary temporally the generated wavelengths.

It is therefore an object of the invention to provide a device mechanism for pumping simultaneously at least two portions of the active medium of a polychromatic or white light laser.

Another object of the invention is to provide independent control for the placement of the pump radiation on the surface of the active medium.

Still another object of the invention is to provide a mechanism for controlling the size of the pump radiation.

Yet still another object of the invention is to control the intensity of the lasing radiation and to be able to vary temporally the wavelengths generated by the laser.

SUMMARY OF THE INVENTION

A controlled spectrum generation laser arrangement achieving these and other objects is realized by employing a pump device comprising a pump laser for generating the pump radiation, an optical divider for dividing the pump radiation into at least two beamlets, and one or more lenses for focusing the radiation onto the active medium. With this arrangement, it possible to direct the pump radiation onto different portions of the active medium and to independently control the coordinates of each pump beamlet so as to realize polychromatic or white light radiation. Furthermore, the described laser arrangement allows one to change the dimensions of the pumped portions of the active medium, thus making it possible to change the spectral width of the generated wavelengths and/or of the generated segments of a continuous radiation spectrum.

In one embodiment, the optical divider comprises at least two rotary reflecting elements, each element capable of independently rotating about two mutually perpendicular axes located in the plane of the respective reflecting element. The mirrors and their axes of rotation are arranged so that rotating the reflecting element about one axis changes the displacement of the pumped portion of the active medium from the optical axis and thereby changes the generated wavelength, while rotating the reflective element about the other axis changes the generated radiation power. Thus, through the variation of the angles at which each reflecting element is rotated, one can control the spectral composition of the white light radiation produced by the controlled spectrum generation laser, as well as the relative power of the generated wavelengths or generated segments of the continuous radiation spectrum.

It is also possible to calibrate each reflecting element such that preset angles of rotation about the respective axes are matched to a predetermined spectral distribution.

In another embodiment of the invention, the reflecting elements are made in the form of concave mirrors capable of translational motion, with the pumping lenses combined into a single common lens. This makes it possible to independently control the spectral width of each of the generated wavelengths or segments of a continuous radiation spectrum with even fewer optical elements.

In another embodiment of the present invention, the optical divider is in the form of an acousto-optic deflector driven with at least two varying control signals of different frequencies. By adjusting the frequency, the angle of deflection for each pump beamlet is changed. Also, the amplitude of the control signals determines the power of the generated radiation. Furthermore, the use of an acousto-optic deflector makes it possible to quickly and accurately select the spectral components of the polychromatic or white light radiation.

Additionally, the ratio of intensities between the spectral components of the generated wavelengths and/or segments of a continuous radiation spectrum can be adjusted by adjusting the amplitudes of the drive control signals. Also, the spectral frequencies or wavelengths of the white light radiation may be varied by temporally controlling the frequencies of the drive control signals.

In another embodiment of the invention, each lens is cylindrical and capable of rotating about two mutually perpendicular axes. The axes are at right angles to the axis of the cylinder forming the surface of each lens. This allows one to optimally orient the pumped portions of the active medium so as to increase the lasing power.

DESCRIPTION OF THE DRAWING

A more complete understanding of the invention may be obtained by reading the following description of illustrative embodiments of the invention in which like elements are labelled similarly and in which.

DETAILED DESCRIPTION OF THE INVENTION

Figure 1:
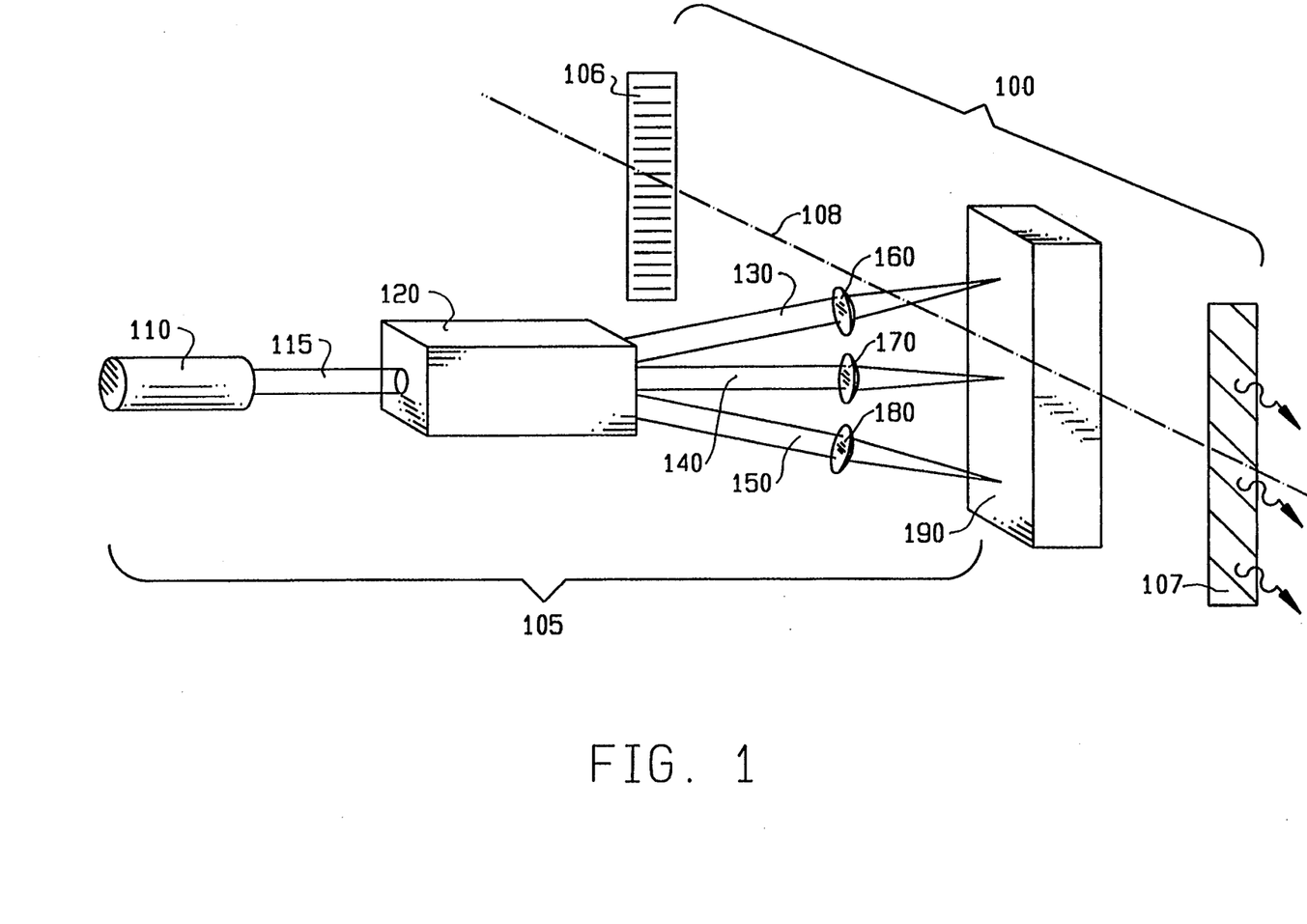
FIG. 1 is a simplified diagram of an whim light laser arrangement in accordance with the principles of the invention.

As shown in FIG. 1, the polychromatic or white light laser arrangement comprises a polychromatic or white light laser 100 and a pump means 105. Polychromatic or whim light laser 100 comprises active medium 190 interposed within a suitable optical cavity. Active medium 190 has a characteristic index of refraction and is capable of amplifying the radiation wavelengths of interest. Preferably, active medium 190 is any of the well known liquid dye solutions that may be optically pumped to emit broadband spontaneous emission, such as a solution of organic dyes. For example, the dyes may include Rhodamine 6G, Rhodamine B, Coumarin 120 and/or Coumarin 153. See, *Introduction to Optical Electronics* by Yariv, Holt, Rinehart and Winston Publishers, New York (1976); and *Laser Guidebook* by Jeff Hecht, McGraw-Hill, New York (1992).

More specifically, the optical cavity comprises a dispersive element 106 and reflective element 107. Dispersive element 106 and reflective element 107 are preferably a concave diffraction grating and mirror, respectively. Active medium 190 is positioned within the optical cavity and centered along an optical axis 108. Dispersive element 106 and reflective element 107 are arranged relative to each other as shown in the drawing such that each generated wavelength is simultaneously amplified within the optical cavity by a different portion of active medium 190. Although the mechanism for simultaneously generating coherent radiation at more than one desired wavelength is discussed in greater detail in applicants' co-pending U.S. patent application entitled "*White Light Laser Technology*," a brief description of the operation is provided below to facilitate the understanding of the present invention.

Pump means 105 comprises a pump laser 110, an optical divider 120, and lenses 160, 170 and 180. Pump laser 110 may be any of the well known pulsed lasers used for pumping an active medium, such as an excimer, nitrogen, solid-state, or copper vapor laser. See, *Laser Guidebook* by Jeff Hecht, McGraw-Hill, New York (1992).

Those skilled in the art will recognize that pump means 105 is used to effect electron population inversion at different portions of active medium 190. Each portion of active medium 190 gives rise to the generation of radiation at a characteristic wavelength.

In operation, polychromatic or white light radiation is realized by simultaneously pumping active medium 190 at different portions. Pump radiation 115 emitting from pump laser 110 is split into beamlets 130, 140 and 150 by optical divider 120. Beamlets 130, 140 and 150 are then focused by lenses 160, 170 and 180, respectively, onto different portions of active medium 190, each portion located at a different distance from optical axis 108 along the dispersive axis of dispersive element 106.

Spontaneous emission from each pumped portion of active medium 190 is directed to dispersive element 106. Dispersive element 106 diffracts the broadband spectrum radiation into their component wavelengths, each component propagating at an angle dependent on its wavelength and in accordance with the well known diffraction grating equation. See, *Principles of Optics* by Born and Wolf, Pergamon Press, New York (1975). For radiation incident on dispersive element 106, only one wavelength component will be reflected back along the propagation direction of the incident radiation onto the corresponding pumped portion of active medium 190. This radiation is amplified and directed onto the surface of reflective element 107. Reflective element 107 redirects the radiation back through the optical cavity, resulting in lasing at a number of predetermined and independently tunable wavelengths. Further, pumping extended portions of active medium 190 gives rise to the generation of segments of a continuous radiation spectrum.

The propagation direction of beamlets 130, 140 and 150 is selected so as to provide a desired spectral composition of the radiation emitted by white light laser 100. Lenses 160, 170 and 180 are spaced from active medium 190 at a distance for providing the desired linewidth of the generated wavelengths or width of the generated segments of a continuous radiation spectrum.

Each beamlet 130, 140 and 150 is directed at a predetermined angle to lenses 160, 170 and 180, respectively, which focus the respective beamlets onto active medium 190. Those skilled in the art will note that the number of beamlets is equal to the number of desired wavelengths and/or segments of a continuous radiation spectrum. The angles at which beamlets 130, 140 and 150 are directed are selected so as to pump those portions of active medium 190 that produce radiation of the desired wavelengths. The linewidth of the generated wavelengths or the width of generated segments of a continuous radiation spectrum depends on the size of the pumped portion of active medium 190 in the direction of the dispersion of dispersive element 106. By changing the distance between lens 160, 170 or 180, and active medium 190, the radiation can be defocused, which in turns changes the size of the pumped portion. In this manner, the linewidth of the generated wavelengths or width of the generated segments of a continuous radiation spectrum is controlled.

It is also contemplated that changing the focal length of the lenses will change the size of the pumped portions of the active medium. Furthermore, lenses 160, 170 and 180 can be of variable focal length.

Because separate a lens is used for each beamlet, the spectral width of each generated wavelength or segment of a continuous radiation spectrum is controlled independently.

Figure 2:
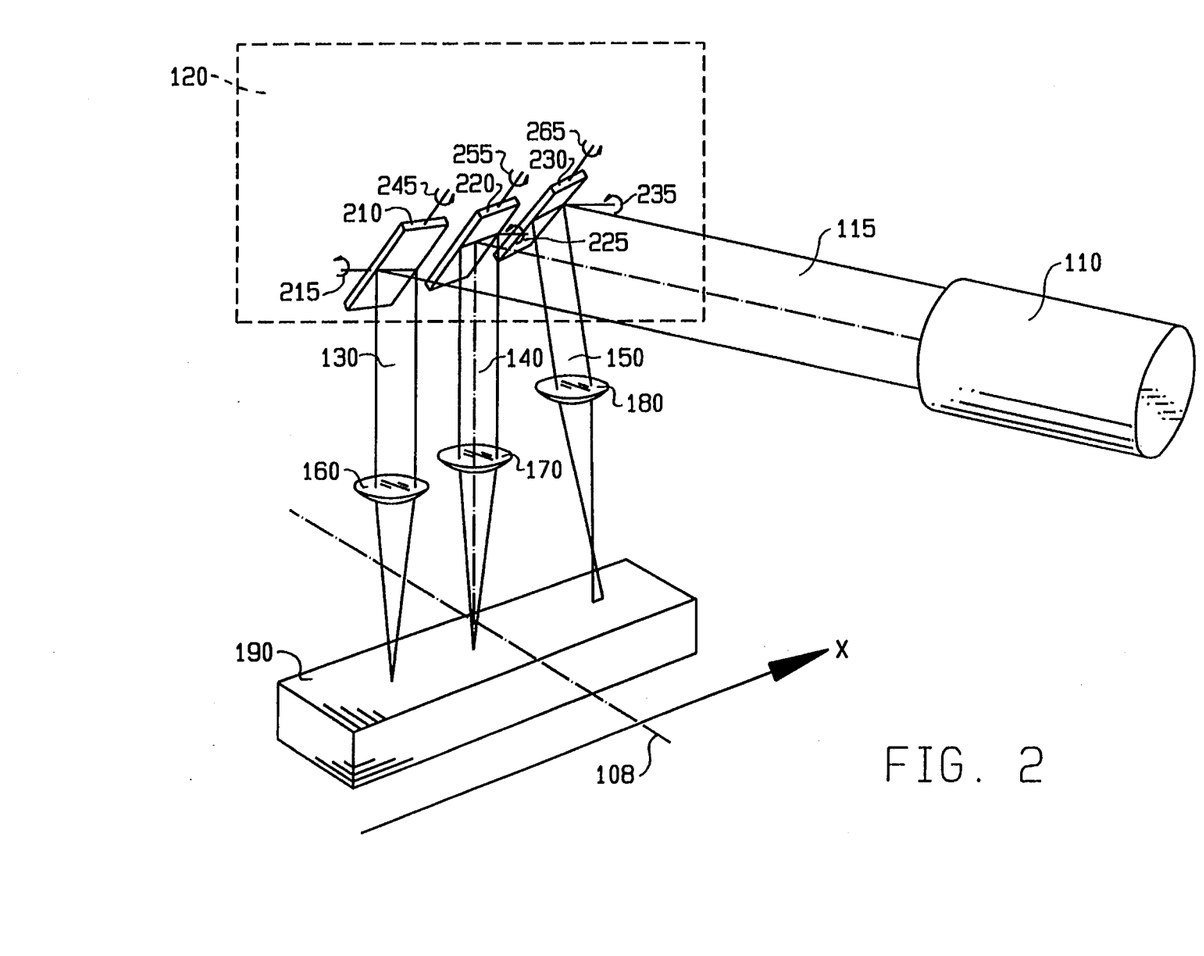
FIG. 2 is a schematic optical diagram of one illustrative embodiment of the pump means of the laser arrangement employing rotary reflective elements.

Referring now to FIG. 2, in one embodiment, optical divider 120 comprises rotary reflecting elements 210, 220, and 230. Each reflecting element may be independently rotated about two mutually perpendicular axes located in the plane thereof. The rotation of reflecting elements 210, 220 and 230 about one axis changes the generated wavelengths, while the rotation of reflecting element 210, 220 and 230 about the other axis changes the power of the generated radiation and/or of the generated segment of a continuous radiation spectrum.

Reflecting elements 210, 220 and 230 may be made, for example, in the form of flat dielectric or metallic mirrors. Reflecting elements 210, 220 and 230 divide pump radiation 115 into beamlets 130, 140 and 150, as shown in the drawing. Beamlets 130, 140 and 150 are then directed through lenses 160, 170 and 180, respectively, and focused onto portions of active medium 190 corresponding to the desired wavelengths and/or segments of a continuous radiation spectrum. The propagation direction of each beamlet 130, 140 or 150 is controlled independently by rotating reflective elements 210, 220 and 230 about axis 215, 225 and 235, respectively. As a result, it is possible to independently change the position of the pumped portions of active medium 190.

Furthermore, the relative pumping radiation power applied to the corresponding portions of active medium 190 can be controlled, for example, by directing beamlets 130, 140 and 150 onto active medium 190 such that only a certain portion of each beamlets is incident on the surface of active medium 190. This can be realized by rotating reflective element 210, 220 or 230 about axes 245, 255 or 265.

It can be shown that the relationship between the linewidth, $\Delta\lambda$, and the focal length, $f$, is given by:

$$L = f\left(1 \pm \frac{\Delta\lambda D_l}{a}\right) \quad (1)$$

where L is the distance of the lens to the active medium, $a$ is the size of the reflective element projected onto the active medium, and $D_l$ is the linear dispersion, defined as $dx/d\lambda$, of the white light radiation.

Figure 3:
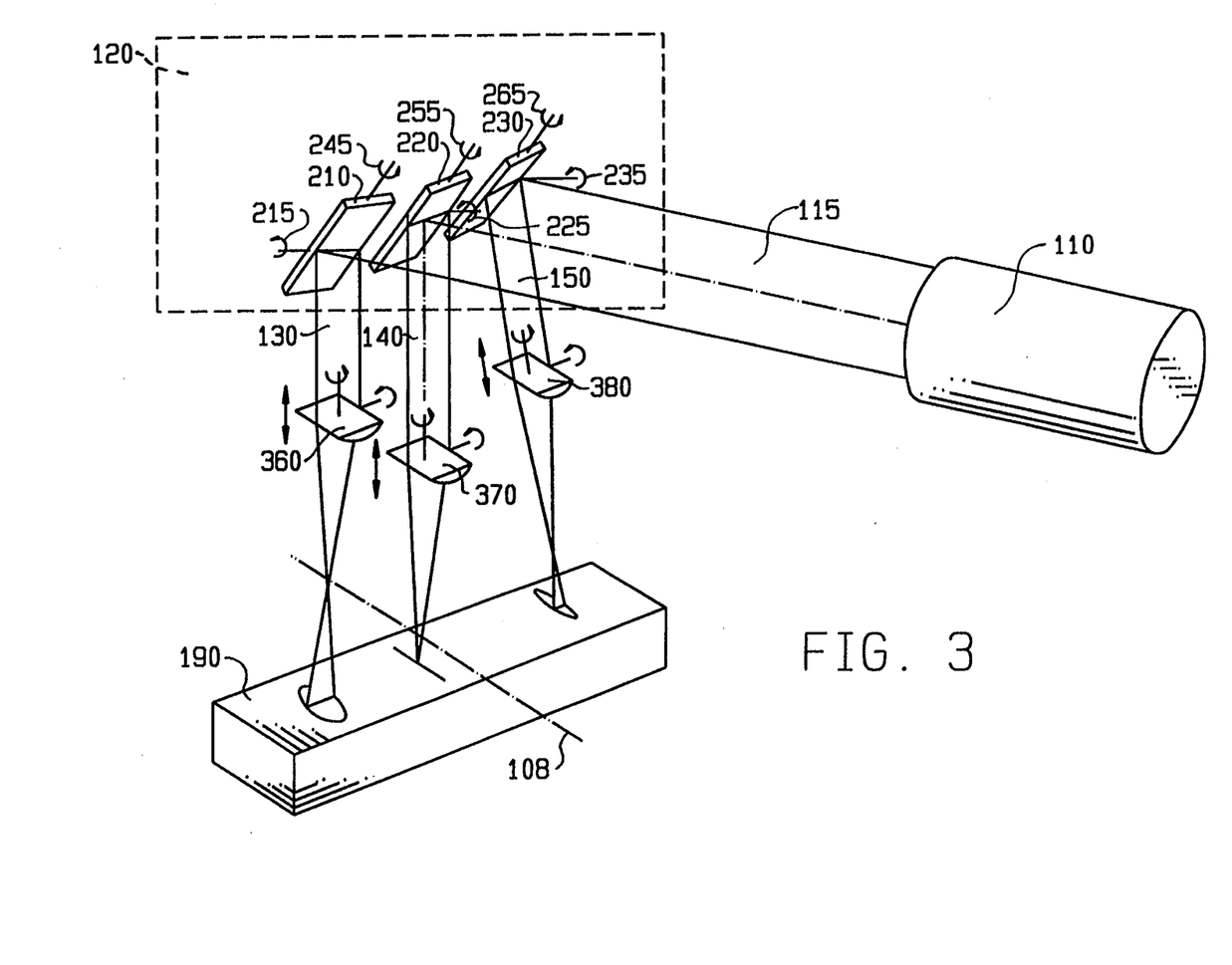
FIG. 3 is a schematic optical diagram of a second illustrative embodiment of the pump means of the laser arrangement employing a cylindrical lens.

As shown in FIG. 3, there is illustrated another embodiment of the present invention, in which the focusing lenses are cylindrical lenses 360, 370 and 380. Each lens is independently rotatable about two mutually perpendicular axes. One axis is at a right angle to the plane of each corresponding lens 360, 370 or 380 and passes through its center. The other axis lies in the same plane, but is at a right angle to the direction of the cylindrical axis. Similarly, in this embodiment the location and size of the pumped portions of active medium 190 is varied by rotating and translating cylindrical lenses 360, 370 and 390 so as to de-focus the pump radiation. Because the cylindrical lenses have only power along one axis, the de-focused pump radiation can generally take the form of an ellipse.

Figure 4:
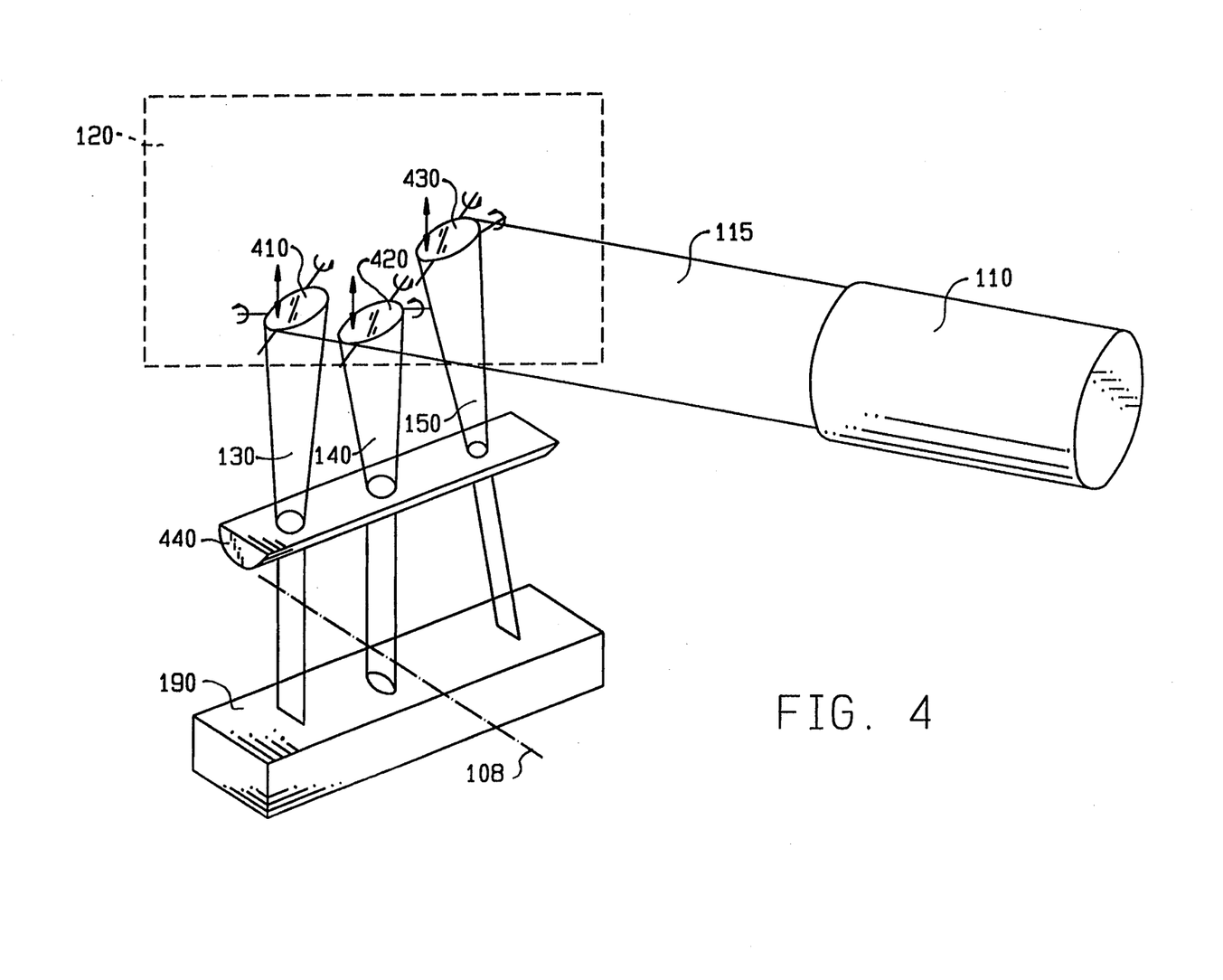
FIG. 4 is a schematic optical diagram of a third illustrative embodiment of the pump means employing a single cylindrical focusing lens and concave reflecting mirrors.

Referring now to FIG. 4, there is illustrated still another embodiment of the present invention, in which elements 410, 420 and 430 denote concave mirrors, and element 440 denotes a cylindrical lens. This embodiment differs from the previous embodiment in that a single focusing lens is used in place of lenses 360, 370 and 380. Reflecting elements 410, 420 and 430 rotate about two mutually perpendicular axes, and translate along the propagation direction of the pump radiation. This makes it possible to control the position and size of the pumped area even with a single common lens.

When the reflecting elements are made as concave spherical mirrors 410, 420, and 430, astigmatism may be used to focus the pumping radiation on the surface of active medium 190 in the form of strips parallel to the optical axis of the laser. In this case, cylindrical lens 440 controls the size of the pumped portions of active medium 190 in the direction of the optical axis of the laser for optimizing the pumping conditions and reducing the pumping radiation losses.

It is also contemplated that planar mirrors may be used instead of concave mirrors 410, 420 and 430. Further, it is contemplated that the reflecting elements in any of the above embodiments may be mounted by techniques well known in the art that allow them to rotate about two mutually perpendicular axes. In those embodiments where the mirrors are not flat, translational motion may also be provided by techniques well known in the art.

Figure 5:
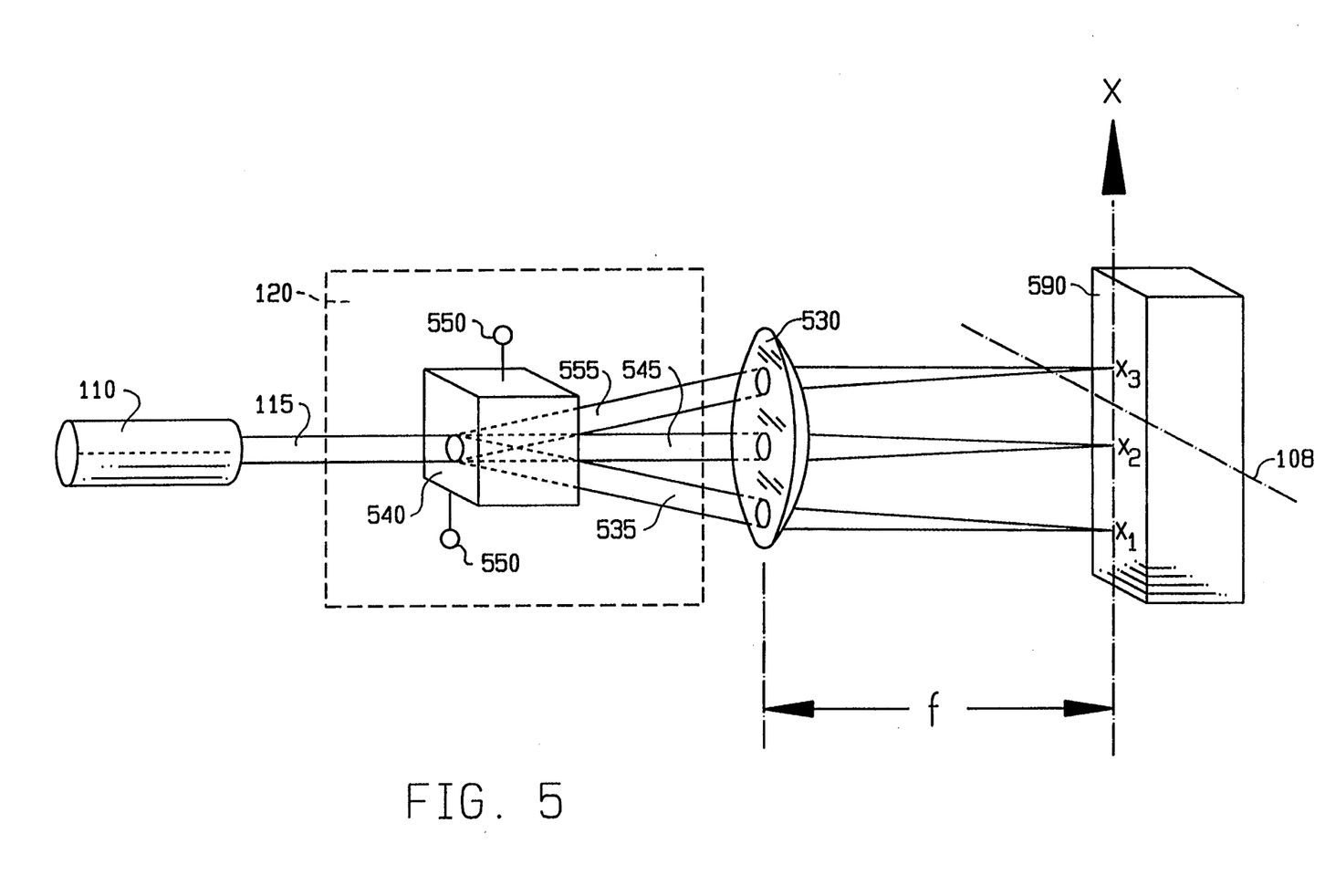
FIG. 5 is a schematic optical diagram of a fourth illustrative embodiment of the pump means employing an acousto-optic deflector.

Referring now to FIG. 5, there is illustrated yet another embodiment in which optical divider 120 employs an acousto-optic deflector 540 for dividing pump radiation 115 into a desired number of beamlets 535, 545 and 555. For a detailed discussion on the operation of acousto-optic deflectors, see *Acousto-Optic Signal Processing* edited by Berg and Lee, Marcel Dekker, Inc., New York (1983); and *Introduction to Optical Electronics* by Yariv, Holt, Rinehart and Winston Publishers, New York (1976), pp. 349-351.

Lens 530 focus each beamlet 535, 545 and 555 onto active medium 190. Preferably, since the focal plane of the lens is not flat due to aberrations, a matching plate is employed (not shown) for conforming the boundary interface of the active medium with the shape of the focal surface of the lens. For a detailed discussion on the operation of the matching plate, see applicants' co-pending U.S. patent application entitled "*Controlled Spectrum Generation Laser.*"

Acousto-optic deflector 540 is driven by drive control signals of different frequencies that are applied to terminals 550 of acousto-optic deflector 540. The number of different frequencies is dependent on the number of beamlets desired or the number of generated wavelengths and/or generated segments of a continuous radiation spectrum. The coordinates, $x_1$, $x_2$ and $x_3$, of the pumped portions of active medium 590 is determined by the frequencies of the drive control signals and the focal length, $f$, of lens 530 in accordance with the following relationship:

$$\Delta\theta = \frac{\lambda}{nv_s} \Delta v_s \quad (2)$$

$$\Delta x = f\tan(\Delta\theta) \quad (3)$$

$$\frac{I_{diffracted}}{I_{incident}} = \sin^2\left(\frac{\pi l}{\sqrt{2}\,\lambda}\sqrt{MI_{acoustic}}\right) \quad (4)$$

where $\Delta\theta$ is the angle of deflection for the radiation beam incident on the deflector, $\lambda$ is the wavelength of the pump laser, n is the index of refraction of the material used in the acousto-optic deflector, $v_s$ is the change in the drive control signal frequency, $v_s$ is the speed of sound in the material of the acoustooptic deflector, $I_{diffracted}$ is the intensity of the deflected or diffracted beam, $I_{incident}$ is the intensity of the incident beam, l is the interaction length, and $I_{acoustic}$ is the intensity of the acoustic wave traveling in the material of the acousto-optic deflector, and M is the diffraction figure of merit.

By changing the drive control signal frequencies, different portions of active medium 190 are pumped, where each portion gives rise to the generation of radiation at a different wavelength. As a result, it is possible to form, for example, the spectral composition of the white light radiation. Furthermore, by temporally varying the drive control frequencies it is possible to vary temporally the generated wavelengths.

It is also well known that a change in the power or amplitude of the drive control signal changes the diffraction efficiency, i.e. the fraction of light directed to a specific order of the diffraction. Accordingly, the pump radiation power and hence the optical power of the spectral components of the white light radiation can be adjusted by controlling the power or amplitude of each of the drive control signals.

Since the spectral and optical power characteristics of the polychromatic or white light radiation are adjusted by varying the characteristics of the drive control signals, only the response time of acousto-optic deflector 540 limits the speed at which the characteristics of the white light radiation can be varied.

It is contemplated that acousto-optic deflector 540 may be any one of the well known acousto-optic deflectors, such as those based on paratellurite $TeO_2$, lead molybdenate $PbMoO_4$, or selenious arsenic glass $As_2Se_3$.

Results from experimental practice indicate that for an acousto-optic deflector based on paratellurite, the diffraction efficiency is approximately equal to 80%, the consumed electric power is approximately 0.2 W, and the operating drive control frequencies lie between 30 MHZ and 230 MHZ, which correspond to a deflection of $\sim 30$ to 80 mrads.

Experimental results further indicate that for lens 560 having a focal length of $\sim 150$ mm that the pumped portion of active medium 590 may be displaced approximately 10–12 mm, which is sufficient for tuning the radiation wavelength from the visible to the near infrared region.

It is understood that various other modifications will be readily apparent to those skilled in the art without departing from the scope and spirit of the invention. For example, it should be understood that the present invention may be used with other polychromatic or white light laser cavity configurations, such as those disclosed in applicants' above-identified co-pending U.S. patent applications. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

We claim:

1. An optical apparatus comprising
    a laser for generating polychromatic or white light radiation having a plurality of spectral components each with a lasing spectrum and optical intensity, said laser having an active medium and an optical axis along which direction said polychromatic or white light radiation propagates, the lasing spectrum of each spectral component of said polychromatic or white light radiation being dependent on the location of a corresponding pumped portion of said active medium,
    means for generating pump radiation,
    acousto-optic means for dividing said pump radiation into a number of beamlets and for controlling the propagation direction of each beamlet so as to control the lasing spectrum and optical intensity of each spectral component of said polychromatic or white light radiation, and
    means optically coupled to said acousto-optic means for focusing each beamlet onto and for pumping a different portion of said active medium so as to produce said polychromatic or white light radiation, the location of each portion of said active medium being pumped dependent on the propagation direction of a corresponding beamlet.

2. The optical apparatus of claim 1 wherein varying the propagation direction of one of said beamlets along an axis perpendicular to the optical axis of said laser varies the lasing spectrum of a corresponding spectral component of said polychromatic or white light radiation.

3. The optical apparatus of claim 1 wherein varying the propagation direction of one of said beamlets along an axis parallel to the optical axis of said laser varies the optical intensity of a corresponding spectral component of said polychromatic or white light radiation.

4. The optical apparatus of claim 1 wherein said polychromatic or white light radiation comprises a plurality of discrete wavelengths each having a predetermined linewidth.

5. The optical apparatus of claim 4 wherein said means for focusing and said active medium have a predetermined spacing therebetween, the spacing between said means for focusing and said active medium determining the linewidth of said discrete wavelengths.

6. The optical apparatus of claim 4 wherein the number of beamlets is equal to a predetermined number of said discrete wavelengths.

7. The optical apparatus of claim 1 wherein said polychromatic or white light radiation comprises segments of a continuous radiation spectrum, each of a predetermined width.

8. The optical apparatus of claim 7 wherein said means for focusing and said active medium have a predetermined spacing therebetween, the spacing between said means for focusing and said active medium determining the width of said segments of a continuous radiation spectrum.

9. The optical apparatus of claim 7 wherein the number of beamlets is equal to a predetermined number of said segments of a continuous radiation spectrum.

10. The optical apparatus of claim 1 wherein said means for focusing includes a cylindrical lens.

11. The optical apparatus of claim 1 wherein for each beamlet there is a corresponding means for focusing.

12. The optical apparatus of claim 11 wherein said means for focusing includes cylindrical lenses, each rotatable about two mutually perpendicular axes and capable of translational motion.

13. The optical apparatus of claim 11 wherein said means for focusing includes spherical lenses, each translatable about an axes.

14. An optical apparatus comprising
a laser for generating polychromatic or white light radiation having a plurality of spectral components each with a lasing spectrum and, optical intensity said laser having an active medium and an optical axis along which said polychromatic or white light radiation propagates, the lasing spectrum of each spectral component of said polychromatic or white light radiation being dependent on the location of a corresponding pumped portion of said active medium,
means for generating pump radiation,
an acousto-optic deflector for dividing said pump radiation into a number of beamlets and for deflecting each beamlet at a different propagation direction, said acousto-optic deflector responsive to drive control signals, each having an associated amplitude and frequency for controlling the intensity and propagation direction of a corresponding beamlet, respectively, so as to vary the the lasing spectrum and optical intensity of said spectral components of said polychromatic or white light radiation, and
means optically coupled to said acousto-optic deflector for focusing each beamlet onto and for pumping a different portion of said active medium so as to produce said polychromatic or white light radiation, the location of each portion of said active medium being pumped dependent on the propagation direction of a corresponding beamlet.

15. The optical apparatus of claim 14 wherein varying the frequency of one of said drive control signals varies the lasing spectrum of a corresponding spectral component of said polychromatic or white light radiation.

16. The optical apparatus of claim 14 wherein varying the amplitude of one of said drive control signals varies the optical intensity of a corresponding spectral component of said polychromatic or white light radiation.

17. The optical apparatus of claim 14 wherein said polychromatic or white light radiation comprises a plurality of discrete wavelengths each having a predetermined linewidth.

18. The optical apparatus of claim 17 wherein said means for focusing and said active medium have a predetermined spacing therebetween, the spacing between said means for focusing and said active medium determining the linewidth of said discrete wavelengths.

19. The optical apparatus of claim 17 wherein the number of beamlets is equal to a predetermined number of said discrete wavelengths.

20. The optical apparatus of claim 14 wherein said polychromatic or white light radiation comprises segments of a continuous radiation spectrum.

21. The optical apparatus of claim 20 wherein said means for focusing and said active medium have a predetermined spacing therebetween, the spacing between said means for focusing and said active medium determining the width of said segments of a continuous radiation spectrum.

22. The optical apparatus of claim 20 wherein the number of beamlets is equal to a predetermined number of said segments of a continuous radiation spectrum.

23. The optical apparatus of claim 14 wherein for each beamlet there is a corresponding means for focusing.

24. The optical apparatus of claim 23 wherein said means for focusing is a lens.

25. The optical apparatus of claim 14 wherein the lasing spectra of said spectral components of the polychromatic or white light radiation are temporally varied by frequency modulating the drive control signals.

26. A method of independently pumping different portions of the active medium of a laser generating radiation along an optical axis, said radiation having a plurality of spectral components each having a lasing spectrum and optical intensity, the lasing spectrum of each spectral component of said radiation being dependent on the location of a corresponding pumped portion of said active medium, said method comprising the steps of:
generating a pump radiation;
directing said pump radiation through an acousto-optic deflector responsive to drive control signals, each drive control signal having an associated amplitude and frequency;
dividing said pump radiation as it propagates through said acousto-optic deflector into at least two beamlets;
controlling the intensity and propagation direction of each beamlet by varying the amplitude and frequency, respectively, of a drive control signal associated with each beamlet; and
focusing each of said beamlets onto a different portion of said active medium so as to pump said active medium and produce said radiation having a plurality of spectral components, the location of each portion being pumped dependent on the propagation direction of a corresponding beamlet.

27. The method of claim 26 further comprising the step of
varying the frequency of one of said drive control signals to control the lasing spectrum of a corresponding spectral component of said radiation having a plurality of spectral components.

28. The method of claim 26 further comprising the step of
varying the amplitude of one of said drive control signals to control the optical intensity of a corresponding spectral component of said radiation having a plurality of spectral components.

29. The method of claim 26 wherein said radiation is polychromatic or white light radiation, wherein each of said beamlets is associated with a spectral component of said polychromatic or white light radiation, each spectral component having a predetermined linewidth.

30. The method of claim 29 further comprising the step of defocusing at least one of said beamlets thereby adjusting the linewidth of a corresponding spectral component of said radiation having a plurality of spectral components.

31. The method of claim 29 further comprising the step of temporally varying the frequency of at least one of said drive control signals to frequency modulate a corresponding spectral component of said polychromatic or white light radiation.

* * * * *